Jan. 8, 1924.
W. R. ANDERSON
1,480,140
SINGLE APERTURE, SINGLE MIRROR VIEW FINDER
Filed Dec. 3, 1920
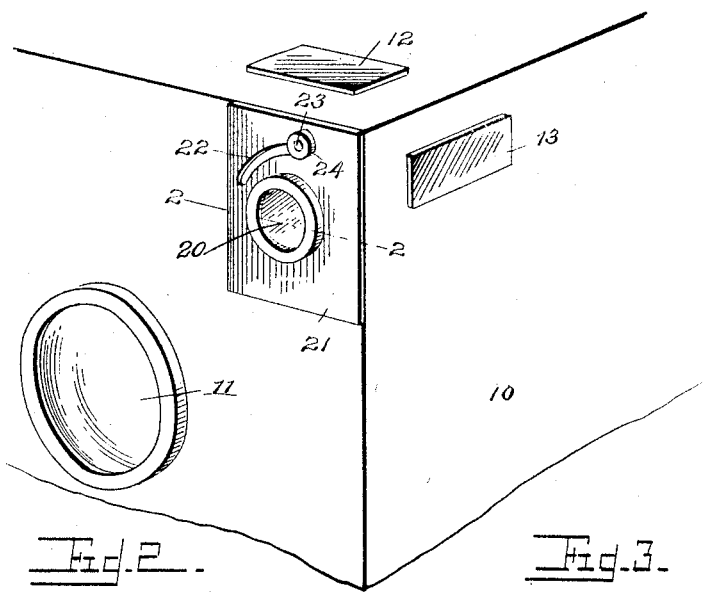
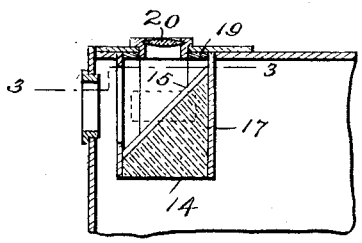
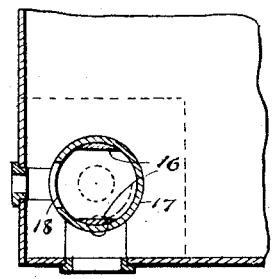
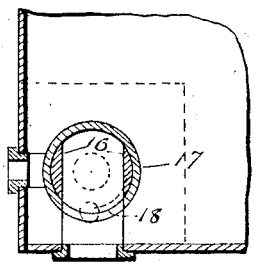
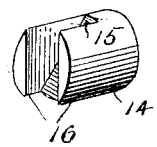
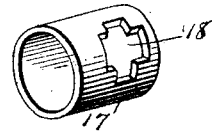

Patented Jan. 8, 1924.

1,480,140

UNITED STATES PATENT OFFICE.

WALTER R. ANDERSON, OF CHICAGO, ILLINOIS.

SINGLE-APERTURE, SINGLE-MIRROR VIEW FINDER.

Application filed December 3, 1920. Serial No. 428,008.

*To all whom it may concern:*

Be it known that I, WALTER R. ANDERSON, a citizen of the United States, residing at Chicago, in the county of Cook and State of Illinois, have invented certain new and useful Improvements in Single-Aperture, Single-Mirror View Finders, of which the following is a specification.

My invention relates to view finders for cameras and the main object of the invention is to provide in conjunction with a photographic camera of the box type, a simple, inexpensive and easily applied view finder.

More specifically stated, the object of my invention is to produce a view finder embodying only a single lens and a single reflector or mirror combined with two view finding openings or windows which are glazed with ground glass or the equivalent thereof. By means of the invention herein fully described and shown, the use of two lenses is eliminated, only one lens being necessary and that used in conjunction with a single reflector or mirror for the purpose of taking either vertically or horizontally elongated pictures. The construction also enables the view finder to be produced in quantity at comparatively small expense both as regards the cost of material and labor.

With the above and other objects in view, the invention consists in the novel construction, combination and arrangement herein shown, described and claimed.

In the accompanying drawings

Figure 1 is a fragmentary perspective view looking toward that corner of a camera box which contains the view finder.

Figure 2 is a fragmentary section on the line 2—2 of Figure 1.

Figure 3 is a section on the line 3—3 of Figure 2, showing one position of the reflector.

Figure 4 is a similar view showing the other position of the reflector.

Figure 5 is a detail perspective view of the reflector holder.

Figure 6 is a detail perspective view of the casing which encloses the reflector holder.

The improved view finder is shown applied to an ordinary box camera designated generally at 10 and having in one side or end wall thereof the usual photographic lens 11. The box 10 is provided in two sides thereof with glazed view finding openings 12 and 13, the elongations of which are at a right angle to each other to assist the photographer in making vertically elongated or horizontally elongated pictures.

Housed within such corner of the camera box is a reflector holder having a substantially cylindrical body 14 formed with a reflector supporting face 15 disposed at an angle of 45° to the axis of the holder. The holder also comprises extended plano-convex wings or bearing portions 16 which lie at opposite sides of the reflector surface 15, the outer surfaces of the wings 16 being convex and conforming to the general cylindrical shape of the holder. Surrounding the holder 14 is a tubular casing 17 in which the holder 14 is tightly fitted, both the holder 14 and the casing 17 being adapted to turn together as a unit. The casing 17 is provided with a cruciform opening 18 to assist in taking vertically and horizontally elongated pictures, the reflection produced by the reflecting surface 13 being projected laterally through the opening 18.

Fixedly secured to one end of the casing 17 is a ring or inturned flange member 19 (see Figure 2) and fastened within the central opening of said member 19 is a view finding lens 20, the latter projecting through the front wall of the camera box as shown in Figure 1. Extending around the lens 20 and behind the circumferential flange of the lens is a face plate 21 which is shown as square although any desired shape may be imparted thereto. The plate 21 is secured fixedly in any suitable way to the camera box and when in place it serves as attaching means for fastening the reflector and its holder as well as the lens 20 to the camera box. The plate 21 also serves as a support for holding said parts in position and it further serves as a journal bearing enabling the lens 20 and reflector holder to be turned about the focal axis of said lens so that the image projected by said lens against the reflector may be transmitted either through the opening 12 or the opening 13.

To enable the reflector holder to be turned through an arc of 90°, the face plate 21 is formed with a curved slot 22 through which passes a pin 23 projecting from the reflector holder, said pin being attached to the ring 19 and being shown as provided with an enlargement or knob 24 to facilitate the operation of turning the reflector for the purpose above set forth.

The construction above described provides a simple and inexpensive view finder for the box type camera, the same being located or housed entirely within one corner of the camera box and requiring only a single view finding lens and a single reflecting surface combined with two observation openings which are ordinarily glazed with ground glass for the purpose stated.

I claim:

1. In a view finder for photographic cameras, a reflector holder consisting of a cylindrical body cut away centrally of one end to provide a reflector-supporting surface inclined at an angle of forty-five degrees to the cylindrical axis of the body, and plano-convex extensions at opposite sides of said inclined surface.

2. In a view finder for photographic cameras, a reflector holder consisting of a cylindrical body cut away centrally of one end to provide a reflector-supporting surface inclined at an angle of forty-five degrees to the cylindrical axis of the body and plano-convex extensions at opposite sides of said inclined surface, and means for turning said holder about its longitudinal axis.

3. In a view finder for photographic cameras, a reflector holder consisting of a cylindrical body cut away centrally of one end to provide a reflector-supporting surface inclined at an angle of forty-five degrees to the cylindrical axis of the body and plano-convex extensions at opposite sides of said inclined surface, and a tubular cylindrical casing fitted tightly around said holder and having a view opening in its side wall in line with the space between said plano-convex extensions.

In testimony whereof I have affixed my signature.

WALTER R. ANDERSON.